3,403,142
PROCESS FOR THE POLYMERIZATION OF OLEFINS

William J. Craven, Passaic, N.J., assignor, by mesne assignments, to Allied Chemical Corporation, New York, N.Y., a corporation of New York
No Drawing. Filed Mar. 16, 1964, Ser. No. 352,344
2 Claims. (Cl. 260—94.9)

ABSTRACT OF THE DISCLOSURE

This invention relates to improving the activity of chromium oxide on silica as a catalyst for polymerizing ethylene by adding to the polymerization system a complex of lithium (lower alkyl) and zinc (lower alkyl)$_2$.

---

It is known in the art that ethylene may be polymerized in the presence of a chromium oxide catalyst on a silica base to form polyethylene (see U.S.P. 2,825,721). Many variations in the basic process have been proposed in order to increase efficiency in the basic polymerization reaction. Other modifications are constantly being sought in order to improve catalyst activity thereby increasing plant efficiency. Quite obviously, if a simple catalyst system could be discovered which would increase activity with little or no increase in catalyst cost, it would receive widespread acceptance in the art.

One object of the present invention is to provide a polymerization system in which the catalyst activity is increased. Another object is to provide a process which adds little if any additional cost to the polymerization process. A still further object is to provide a process which is easily controlled. Another object is to provide a process which is simple and economical in operation. Other objects will become apparent as the description of the invention proceeds.

These objects are accomplished by the present invention which provides an improvement in the process for the polymerization of an ethylene monomer in the presence of chromium oxide ($CrO_3$) on a silica base, the improvement comprising carrying out the polymerization in the presence of a complex of Li(Lower alkyl) with a compound selected from the group consisting of Al(lower alkyl)$_3$ and Zn(lower alkyl)$_2$.

The expression "polymerization of an ethylene monomer" is used to signify the process set forth in U.S.P. 2,825,721 in which ethylene, or ethylene containing an alpha olefin comonomer, is polymerized to polyethylene. Many other patents describe the same polymerization technique. The term "lower alkyl" merely signifies an alkyl group containing from about 2 to about 7 carbon atoms such as ethyl, butyl, heptyl, hexyl and the like.

In a preferred embodiment of the present invention, the polymerization is carried out in the presence of a complex of lithium butyl and aluminum triethyl or zinc diethyl or mixtures thereof. The resulting complex of the materials is an ionic complex and in most instances is formed by mixing equimolar portions of the lithium compound with the aluminum alkyl compound or the zinc alkyl compound. While equimolar proportions are not necessary in order to form the complex, equimolar proportions give the maximum amount of complex as the reaction proceeds in this manner. When more than a molar amount of one of the complexing ingredients is employed, it merely leaves as an excess of one reactant which is not generally desirable in the system.

The complex is formed by mixing the two complexing ingredients in a solvent system. Preferably, cyclohexane is used as the solvent. In the preferred embodiment, the reaction to form the complex proceeds as follows:

$$LiBu + Al(Et)_3 \rightarrow Li^+[BuAl(Et)_3]^- \text{ complex}$$

and $$LiBu + Zn(Et)_2 \rightarrow Li^+[BuZn(Et)_2]^- \text{ complex}$$

When lithium butyl and triethyl aluminum are mixed a white flocculant precipitate is formed. When zinc diethyl is added to the lithium butyl, the resulting complex is soluble in the cyclohexane or results in only a slight turbidity of the solution. The resulting complex is added to the catalyst in the system and the conventional ethylene polymerization reaction carried out.

In a preferred embodiment, the complex is added to the catalyst system in the range of from about 0.1 to about 4 times the amount of chromium in the catalyst on a molar basis. In a still more preferred embodiment, the complex is added in approximately equal molar proportions with the chromium in the catalyst system.

The following examples are given to illustrate the invention and are not intended to limit it in any manner. In the examples all parts are given in parts by weight unless otherwise indicated.

EXAMPLE 1

Preparation of complex

A 20 cc. test tube is maintained under a nitrogen atmosphere and to it is added 5 cc. of freshly distilled cyclohexane and then 1.5 cc. of 0.4 molar lithium butyl in cyclohexane and 1.2 cc. of 0.5 molar aluminum triethyl in cyclohexane. Immediately a gelatinous white precipitate forms. The complex is $Li^+[BuAl(Et)_3]^-$.

Preparation of catalyst

A silica-13% alumina catalyst base is impregnated with 4.5 weight percent of chromic oxide ($CrO_3$). The catalyst is heated in a fluidized stream with dry air at 1200° F. for 6 hours. 0.4 g. of the resulting activated catalyst is used in the ethylene polymerization.

Preparation of polyethylene

The above 0.4 g. of catalyst is added to a 1 liter stainless steel pressure reactor. 500 cc. of freshly distilled cyclohexane is added to the reactor and the reactor blanketed with nitrogen. The above described complex including the cyclohexane is then added to the sealed system. Thus, 3.3 moles of complex are used for each mole of chromium in the catalyst system. The reactor is heated to a temperature of 260° F. and ethylene is introduced at a rate sufficient to build the pressure in the reactor to 450 p.s.i.g. in about 10 minutes. Ethylene is introduced as needed to maintain the pressure at 450 p.s.i.g. for a period of 50 minutes. An exothermic reaction ensues and the temperature in the reactor rises to 290° F. after 10 minutes. The average temperature during the entire course of the reaction is approximately 285° F. After 1 hour, the polyethylene in the reaction vessel is removed and dried.

A control run is carried out under the identical conditions with the exception that no complex is added to the system.

The results of both runs are given in Table I.

EXAMPLES 2 AND 3

The complex and catalyst are prepared in the same manner as in Example 1. The polymerization of ethylene is carried out in the same manner as in Example 1 with the exception that the ratio of complex to chromium is 1/1, rather than 3.3/1, and the average temperature during the course of the reaction is approximately 285° F. (Example 2) and 291° F. (Example 3). The other reaction conditions are the same as in Example 1.

The results of both runs are given in Table I.

EXAMPLE 4

Preparation of complex

A 20 cc. test tube is maintained under a nitrogen atmosphere and to it is added 5 cc. of freshly distilled cyclohexane and then 1.0 cc. of 0.4 molar lithium butyl in cyclohexane and 0.4 cc. of 1.0 molar zinc diethyl in cyclohexane. A slight turbidity forms in the solution. The complex is $Li^+[BuZn(Et)_2]^-$.

Preparation of catalyst

A silica-13% alumina catalyst base is impregnated with 4.5 weight percent of chromic oxide ($CrO_3$). The catalyst is heated in a fluidized stream with dry air at 1200° F. for 6 hours. 0.48 g. of the resulting activated catalyst is used in the ethylene polymerization.

Polymerization of ethylene

The above 0.48 g. of catalyst is added to a 1 liter stainless steel pressure reactor. 500 cc. of freshly distilled cyclohexane is added to the reactor and the reactor blanketed with nitrogen. 3.4 cc. of the above described complex including the cyclohexane is then added to the sealed system. Thus, 1 mole of complex is used for each mole of chromium in the catalyst system. The reactor is heated to a temperature of 275° F. and ethylene is introduced at a rate sufficient to build the pressure in the reactor to 450 p.s.i.g. in about 10 minutes. Ethylene is introduced as needed to maintain the pressure at 450 p.s.i.g. An exothermic reaction ensues and the temperature in the reactor rises to 340° F. after 10 minutes. The average temperature during the entire course of the reaction is approximately 290° F. After 20 minutes, the polyethylene in the reaction vessel is removed and dried.

The result of the run is given in Table I.

EXAMPLE 5

The procedure of Example 4 is repeated with the exception that the average reaction temperature is 285° F. rather than 290° F. as in Example 4.

The result of the run is given in Table I.

EXAMPLE 6

The procedure of Example 4 is repeated with the exception that the ratio of complex/chromium is 3/1, rather than 1/1, and an average reaction temperature of 275° F. is employed rather than 290° F. as in Example 4.

The result of the run is given in Table I.

EXAMPLE 7

The procedure of Example 2 is repeated with the exception that 0.96 g. of catalyst is used and 8% by weight of butene-1 is employed in the ethylene feed with the average reaction temperature being 288° F. Also, rather than use a silica-13% alumina catalyst base, a microspheroidal silica is employed as the base for the catalyst.

A control run is carried out under the identical conditions with the exception that no complex is added to the system and the average reaction temperature is 281° F.

The results of the run is given in Table I.

EXAMPLE 8

The procedure of Example 2 is repeated with the exception that 0.96 g. of catalyst is used and 6% by weight of butene-1 is employed in the ethylene feed with the average reaction temperature being 290° F. Also, rather than use as silica-13% alumina catalyst base, a microspheroidal silica is employed as the base for the catalyst.

The result of the run is given in Table I.

TABLE I

| Example | Ratio complex/Cr | Average reaction Temp., ° F. | Density | Melt index, ASTM D1238-597 | Catalyst activity, g./g./hr. |
|---|---|---|---|---|---|
| 1 | 3.3/1 | 278 | 0.952 | 0.27 | 354 |
| Control | None | 280 | 0.962 | 0.45 | 208 |
| 2 | 1/1 | 285 | 0.955 | 1.42 | 274 |
| 3 | 1/1 | 291 | 0.955 | 2.00 | 250 |
| 4 | 1/1 | 290 | 0.957 | 1.16 | 627 |
| 5 | 1/1 | 285 | 0.960 | 0.21 | 360 |
| 6 | 3/1 | 275 | 0.960 | 0.12 | 290 |
| 7 | 1/1 | 288 | 0.932 | 3.51 | 350 |
| Control | None | 281 | 0.938 | 4.70 | 214 |
| 8 | 1/1 | 290 | 0.948 | 1.75 | 588 |

As shown in Table I, the use of the additives of the present invention in the catalyst system very noticeably increase catalyst activity. In some instances, the additives can be used to increase activity without substantial alteration of the final polymer properties. In other instances, it may be used to modify the density and/or melt index at a very high rate of catalyst activity.

While in the above example, only ethylene and ethylene in combination with butene-1 are employed in the polymerization reaction, it is obvious that other alpha-olefin comonomers may be employed with the ethylene. In general, the ethylene will constitute 85% or more of the monomer ingredients with the remaining ingredients being one or more other alpha-olefin comonomers.

Many other equivalent modifications will be apparent to those skilled in the art from a reading of the foregoing without a departure from the inventive concept.

What is claimed is:

1. In the process for the polymerization of ethylene monomer in the presence of chromium oxide on a silica base to form polyethylene, the improvement which comprises carrying out the polymerization in the presence of a complex of lithium (lower alkyl) with Zn (lower alkyl)$_2$.

2. In the process for the polymerization of ethylene monomer in the presence of chromium oxide on a silica base to form polyethylene, the improvement which comprises carrying out the polymerization in the presence of a complex of lithium butyl and zinc diethyl.

References Cited

UNITED STATES PATENTS

| | | |
|---|---|---|
| 2,731,453 | 1/1956 | Field. |
| 2,908,669 | 10/1959 | Hagemeyer. |
| 3,158,594 | 11/1964 | Weil. |
| 3,277,070 | 10/1966 | Van Weynbergh et al. 260—94.9 |

JOSEPH L. SCHOFER, *Primary Examiner.*

M. B. KURTZMAN, *Assistant Examiner.*